Patented July 4, 1939

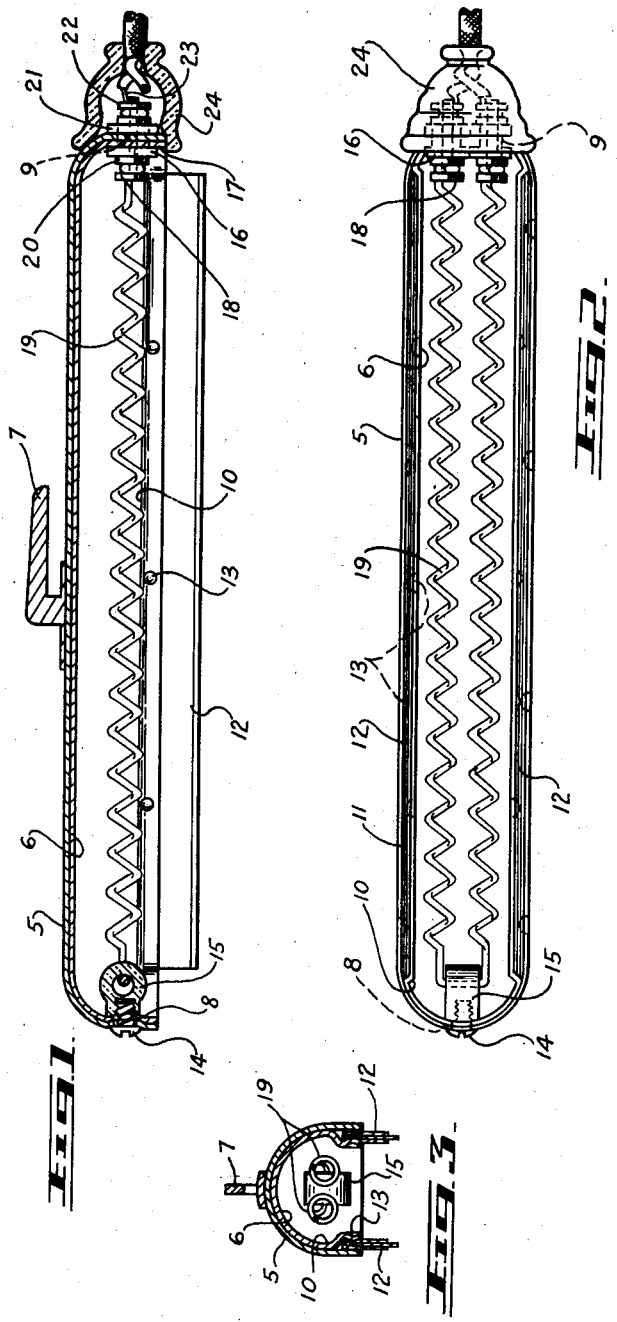

2,164,829

UNITED STATES PATENT OFFICE 2,164,829

WINDSHIELD WIPER

Harold B. MacRobert, Florence, Ontario, Canada, assignor of one-half to Roscoe L. MacRobert, Toronto, Ontario, Canada Application July 15, 1938, Serial No. 219,431

3 Claims. (Cl. 219—19)

This invention relates to improvements in a windshield wiper and appertains particularly to one adapted to operate successfully when ice, sleet and snow are forming and/or collecting on the windshield, being provided with a heating element for melting the accumulating ice, sleet and snow and one or more wiper blades to clean the glass off and afford the driver a clear unobstructed view.

An object of the invention is to provide a combined windshield defroster and wiper embodying improvements in the design of casing, manner of assembling, mounting the element and supporting the wipers.

A further object of the invention is the provision of a windshield wiper of the nature and for the purposes described that is characterized by structural simplicity, durability, efficiency and low cost of production, being thereby rendered commercially desirable.

To the accomplishment of these and related objects as shall become apparent as the description proceeds, the invention resides in the construction, combination and arrangement of parts as shall be hereinafter more fully described, illustrated in the accompanying drawing and pointed out in the claims hereunto appended.

The invention will be best understood and can be more clearly described when reference is had to the drawing forming a part of this disclosure, wherein like characters indicate like parts throughout the several views.

In the drawing:

Figure 1 is a longitudinal section of a possible embodiment of my wiper;

Figure 2 is a bottom plan view thereof; and

Figure 3 is a transverse section.

The casing, semi-circular in cross-section, elongated and with rounded ends, is composed of outer and inner shells 5 and 6 respectively, the latter fitting snugly within the former. In addition to an arm receiving bracket 7 on the middle of the back of the outer shell 5, both casing shells 5 and 6 have perforations 8, centrally of the outer end, that are in registry and a laterally spaced pair of perforations 9, that also register in pairs, one on either side of centre, at the inner end.

Further along both sides for their parallel length, the opposite sides 10 of the inner shell 6 are offset inwardly at their free edge being thus spaced from the confronting edges of the outer shell to provide a trough 11 for the accommodation of wiper rubbers 12 that are securely fastened therein by staggered indentations 13 alternating in outer and inner shells.

Through the perforations 8, a suitable bolt 14 of dielectric or nonconducting material is passed to screw into the interiorly threaded butt of a dielectric or non-conducting eyelet 15. Through each of the pair of registering openings 9 in the inner end of the casing, a centrally perforated, large diameter, dielectric bolt 16 is passed and on its exposed end a nut 17 of similar insulating material is tightened. Outwardly through each of the insulated openings thus provided, I pass a bolt 18. The opposite ends of an electric heating element 19, that is centrally threaded through the remote eyelet 15, are clamped against the heads of these bolts 18 by nuts 20. Exteriorly of these insulated openings through the casing, the bolts 18 have jamb nuts 21 that tighten against the insulators and beyond these nuts are other nuts 22 for attaching the electric lead wires 23 that connect with the source. A soft rubber cap 24, tightly engaging the lead wire cable, envelopes the exposed connections.

In use, this electrically heated windshield wiper may be served by a circuit through a switch in the dash so that the heater may be worked independently of the operation of the wiper. Furthermore, a rheostat may be found useful in controlling the heating circuit.

From the foregoing description taken in connection with the accompanying drawing, it will be manifest that a windshield wiper is provided that will fulfil al the necessary requirements of such a device but as many changes could be made in the above description and many apparently widely different embodiments of the invention may be constructed within the scope of the appended claims without departing from the spirit or scope thereof, it is intended that all matters contained in the said accompanying specification and drawing shall be interpreted as illustrative and not in a limitative or restrictive sense.

Having thus described the invention, what I claim as new is:

1. A windshield wiper comprising a casing formed of a pair of elongated nested shells, substantially semicircular in cross section, wiping rubbers held between said shells along both sides, a perforation through both shells at one end, a pair of laterally spaced perforations through both shells at opposite end, dielectric securing means extending through the perforations in said shells to retain said casing assembled, and an electric element supported in said casing by said dielectric securing means.

2. A combined windshield wiper and defroster comprising a casing formed of a pair of elongated nested shells, semicircular in cross section, a perforation through both shells at one end, a pair of laterally spaced perforations through both shells at the opposite end, securing means passed through the registering perforations in said shells to retain the assembly and an electric element carried thereby.

3. A combined windshield wiper and defroster comprising an elongated casing semicircular in cross section and formed of a pair of nested shells, wiping rubbers secured between said shells along both sides, registering perforations through both shells at the far end, a dielectric bolt passed inwards through said perforations, a dielectric eyelet on the inner end of said bolt, an electric element threaded through said eyelet, a pair of laterally spaced perforations through the near end of both shells, one on either side of centre, an axially bored dielectric nut and bolt assembly through each of said laterally spaced perforations, a long bolt through each of said bored dielectric assemblies having a nut clamping an end of said electric element thereto, a jamb nut on the outer end of each of said long bolts tightened against the outside of said bored dielectric assembly, another nut threaded thereon to hold the electric lead wire and a rubber cap enveloping the exposed connections.

HAROLD B. MacROBERT.